Figure 1:
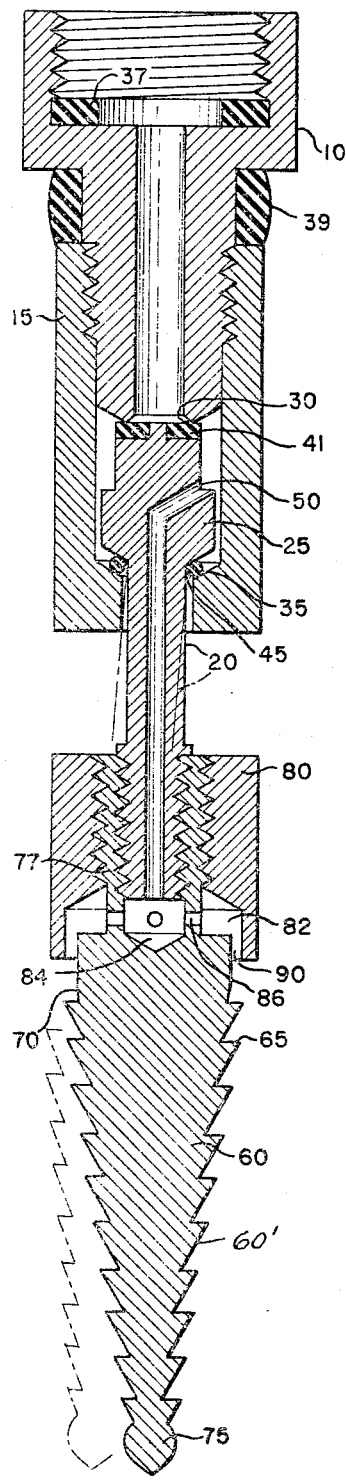

May 30, 1967 R. P. EAGLES ET AL 3,322,101

NOZZLE

Filed Dec. 30, 1965

INVENTORS
ROBERT P. EAGLES
RONALD W. SOUTHWARD

BY

G. William King
ATTORNEYS

# United States Patent Office 3,322,101
Patented May 30, 1967

3,322,101
NOZZLE
Robert P. Eagles and Ronald W. Southward, Richmond, Va., assignors to A. H. Robins Company, Incorporated, Richmond, Va., a corporation of Virginia
Filed Dec. 30, 1965, Ser. No. 517,535
5 Claims. (Cl. 119—72.5)

This invention relates to a nozzle, and particularly to a nozzle adapted to be attached to a source of water, and to deliver water to animals for direct consumption therefrom, thereby conserving water, eliminating the need for water bottles that must be maintained daily, and controlling unsanitary conditions due to spillage.

The nozzle of the present invention may be attached to any source of water, but is especially constructed for attachment to an animal watering device of the type described in pending application, Ser. No. 422,985, filed Mar. 26, 1965, now Patent No. 3,289,635, the disclosure of which is hereby incorporated by reference.

The primary object of the present invention is to provide a nozzle for an animal watering device which is particularly adapted to water animals that prefer, or must drink by licking. The nozzle directs the flow of substantially all water passing therethrough onto a serrated nipple member. The nipple member is so constructed that the water flows over its serrated portions in a shallow layer, without dripping, whereby the water may be licked from the nipple.

Further objects are, to provide a nozzle that can be used by animals of various sizes and which will provide the above-mentioned advantages and yet be relatively inexpensive to make.

Figure 2:
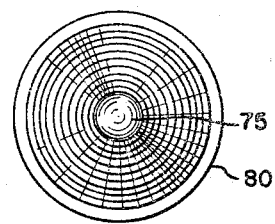

Other objects and advantages of the present invention will become apparent to those skilled in the art from the appended claims and following description of the best mode of carrying out this invention, taken in connection with the drawing, wherein:

FIGURE 1 is a cross-sectional elevation view taken through the center of the watering valve nozzle of the present invention, and, FIGURE 2 is an end view looking upwardly along the central logitudinal axis of the device as shown in FIGURE 1.

Referring now to the drawing, the nozzle of the present invention is illustrated attached to the watering device disclosed in the above-identified copending application, the latter briefly comprising a water inlet connection 10, a valve body 15 threadably connected with connection 10, and a tubular valve member 20. Valve member 20 has a valve head 25 positioned in valve body 15, urged into sealing engagement against a valve seat 30 by resilient O-ring 35. Elements 37, 39 and 41 are gaskets to facilitate sealing. The space 45 between valve member 20 and valve body 15 is sufficient to permit the valve head to be displaced from sealing engagement with valve seat 30, thereby permitting water or other suitable liquid to flow through connection 10, and escape through channel 50 in valve member 20.

While the above described device may be employed to water animals directly from tubular valve member 20, nevertheless, some animals find it difficult to drink from a tube even when the liquid is flowing at a relatively slow rate, monkeys and dogs in particular.

Therefore, in accordance with the present invention, a nozzle attachment is provided for the device above described, which will permit the animal to lick a relatively large surface, retaining a shallow layer of water flowing substantially evenly about the nozzle.

As shown in the drawing, the preferred nozzle attachment of the present invention is comprised of a licking nipple 60 which is preferably of substantially conical shape and has a plurality of annular serrations 65 which are preferably circular about the nipple, but may spiral, or be elliptical or of irregular shape so long as a substantial proportion of the serrations is cut in a direction across the nipple. A round base 70 and a smoothly contoured tip 75 complete the nipple which is provided with a licking portion 60'. Projecting from base 70 is an integrally formed, tubular boss 77, threaded internally and externally. The external threads of boss 77 threadably engage a deflecting sleeve 80 which is preferably a metal member having a recessed deflecting chamber 82, formed in the end thereof facing nipple 60. The interior threaded wall of boss 77 is threadably engaged with valve member 20, or to any other suitable watering device, it being understood that the watering device of which valve member 20 is a part, is the preferred device for use with the nozzle of the present invention, but that the latter may be used with any suitable source of water. Valve member 20 is adapted to deliver water into outlet plenum 84 which is formed in part by cutting from nipple base 70 and boss 77. Water outlet ports 86 extending from the outlet chamber 84 through boss 77 communicate with deflecting chamber 82. The deflecting sleeve is threadably adjusted along boss 77 so as to provide a suitable deflecting channel 90 which directs the liquid flowing out of ports 86, down along cone 60, where the serrations create an effect which produces a shallow cascading flow of water substantially about the entire surface of the nipple, thereby enabling an animal to lick the nipple and obtain water on approximately the entire surface of its tongue, which drinking action is particularly suited for dogs and monkeys. As the water pressure or volume is changed, deflecting sleeve 80 may be adjusted to provide the proper deflecting channel 90. As illustrated in the drawing, it is preferred that the nipple be directed downwardly at a slight angle from vertical as this particular position makes the nipple more convenient to the animal, thereby further reducing the possibility of spillage.

While nipple 60 is preferably conical, it may also be frusto-conical, cylindrical, or any configuration between cylindrical and conical.

To summarize the operation then, an animal contacts the nipple 60 thereby creating an opening between valve member 25 and chamber 30 and permitting water to flow through channel 50, and through outlet ports 86 and deflecting channel 90, about nipple 60.

The invention may be embodied in other specific forms without departing from the spirit or essential characteristics there. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An animal feeding nozzle comprising a nozzle body with means at one end thereof for attaching said body to a source of liquid, a nipple member fixed at one end thereof to said body member and having a licking portion on said other end and said licking portion including a plurality of crosswise serrations on the surface thereof and channel means in the body and nipple members for guiding said liquid through said body member to the exterior surface of the licking portion of said nipple member.

2. A nozzle as defined in claim 1, wherein said nipple member is substantially conical, with the base thereof fixed to said body member and said channel means is adapted to direct said liquid downwardly about said nipple member.

3. A nozzle as defined in claim 1, wherein said nipple member is substantially conical with the base thereof fixed to said body member, and the serrations thereon being formed by grooves cut into the surfaces thereof.

4. A nozzle as defined in claim 1, wherein said nipple member is generally cone-shaped in configuration with the base thereof fixed to said nozzle body, said serrations formed by grooves cut into the surface thereof, and said channeling means comprising a conduit extending through said nozzle body for deflecting said liquid onto the outer surface of said nipple member.

5. In a liquid dispensing nozzle, a licking nipple member, cone shaped in general configuration and having a plurality of crosswise serrations on the surface at one end comprising means for cascading liquid down the surface, said nipple including a channel means in the other end communicating with said surface.

References Cited
UNITED STATES PATENTS

| | | | |
|---|---|---|---|
| 649,593 | 5/1900 | Black | 128—252 |
| 1,731,302 | 10/1929 | Erringer | 128—360 X |
| 2,193,258 | 3/1940 | Shaw et al. | 119—72.5 |
| 2,486,729 | 11/1949 | Beckley | 119—72.5 |
| 2,510,252 | 6/1950 | Pine | 119—72.5 |
| 3,008,451 | 11/1961 | Curry | 119—72.5 |
| 3,186,411 | 6/1965 | Skidmore | 128—360 |

ALDRICH F. MEDBERY, *Primary Examiner.*

SAMUEL KOREN, *Examiner.*